Dec. 27, 1932.  O. P. GAYMAN  1,892,460
LANDING AND LAUNCHING DEVICE FOR AIR VEHICLES
Filed Feb. 11, 1932
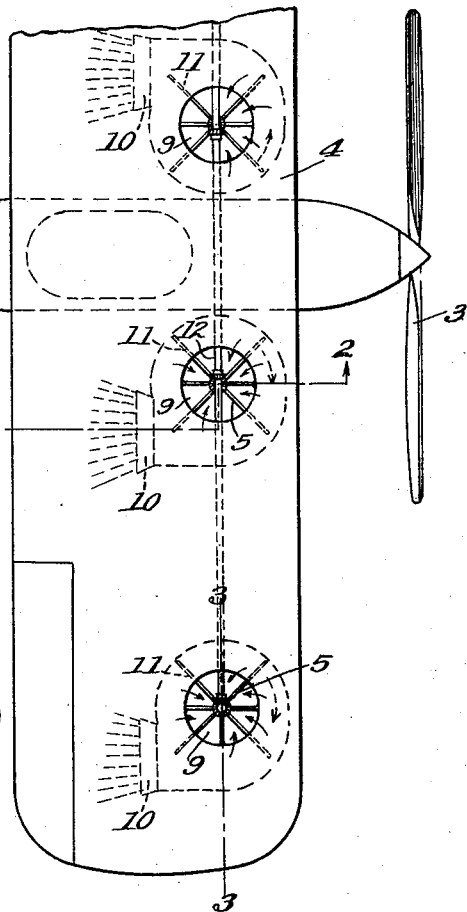
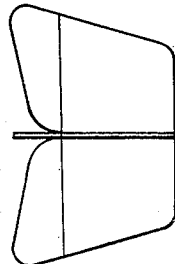
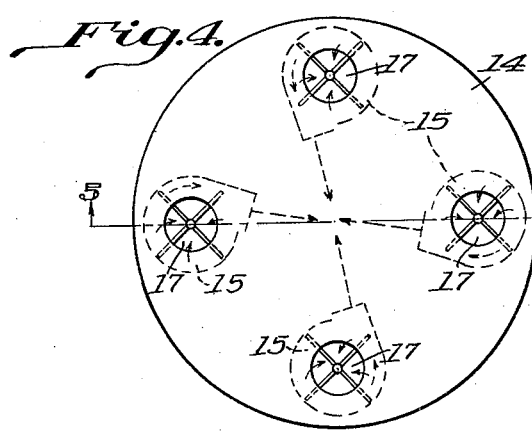
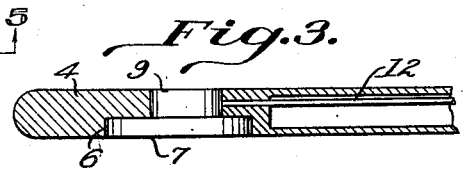
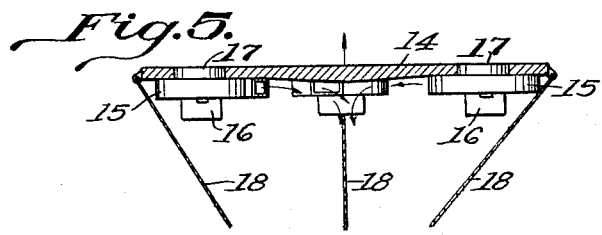

Patented Dec. 27, 1932

1,892,460

UNITED STATES PATENT OFFICE

OLIVER P. GAYMAN, OF CANAL WINCHESTER, OHIO

LANDING AND LAUNCHING DEVICE FOR AIR VEHICLES

Application filed February 11, 1932. Serial No. 592,360.

This invention relates to improvements in air craft and is directed more particularly to a landing and launching device for airplanes whereby the plane may be launched or make a get away in a comparatively restricted area with safety and likewise may make a safe landing in a restricted landing place.

The invention has for a further object to provide a wing structure of an airplane or like vehicle with lifting mechanism in the form of power driven centrifugal blowers or fans so arranged in connection with the wings or air supporting surfaces of the vehicle that the fans will draw air from the space above the wings or supporting surfaces to the space below and directing the air laterally under said surfaces so as to increase the lifting pressure of the air thereon with the result that the plane will tend to rise more quickly.

I am aware that it has been proposed heretofore to equip airplanes with power driven lifting means in the wings thereof for aiding the plane in its take off and landing. This means has, in all cases that I am familiar with, been of the disk or screw type of fan positioned within or relative to an opening formed in the wing body. An objection to this kind of installation is that it necessitates the forming of the openings for the fans straight through the wing body in order that the air may pass therethrough from one side to the other. These openings, due to their relatively large size, reduces the effective wing area of the plane as in horizontal flight, the propellers need not be in operation. By the use of centrifugal blowers instead and arranging the same horizontally in connection with the wings of the plane with the outlets of the blowers directed laterally therefrom, the openings in the wing body for the blowers may be closed by the blower housings, leaving the under surface of the wing unbroken for the support of the plane.

Another object of the invention is to direct the air from the blowers laterally and angularly to the under surfaces of the wings to give a lifting effect upon the plane.

A further object is to position the blowers within the wing structure of the plane, so as to offer no resistance to the air during flight of the plane or destroy the customary line or contour of the wing structure.

A still further object is to locate the blowers within the forward portion of the wing structure and arrange the outlets thereof rearwardly so that the air issuing therefrom not only causes a lifting action upon the under surfaces of the wings but due to its direction will also tend to propel the plane forwardly.

With these and other objects in view, as will appear as the description proceeds, the invention consists in the novel features of construction, combinations of elements and arrangements of parts hereinafter to be fully described and pointed out in the appended claims.

In the accompanying drawing:

Fig. 1 is a top plan view of an airplane showing the improved lifting mechanism in connection with the wing structure thereof;

Fig. 2 is a transverse vertical sectional view taken on the line 2—2 of Fig. 1;

Fig. 3 is a fragmentary longitudinal sectional view taken on the line 3—3 of Fig. 1;

Fig. 4 is a plan view showing the lifting mechanism in connection with a captive flying machine of the helicopter principle; and Fig. 5 is a vertical sectional view taken therethrough on the line 5—5 of Fig. 4.

Referring more particularly to the drawing, I have shown my improved lifting mechanism in connection with the conventional type of airplane and also a diagrammatic showing of its application to a flying machine of the helicopter type. In the preferred form of the invention, the plane is designated generally by the numeral 1 and comprises the fuselage 2 having arranged in the forward portion thereof the engine which is usually connected by means of its crank shaft to the propeller 3. Arranged transversely of the fuselage is the wing structure 4 to which this invention is particularly directed.

In order that the plane may rise from the ground in a relatively vertical course and to provide for a more gentle descending thereof in a similar course, the wing or wings 4 of the plane are equipped with one or more lifting mechanisms 5 which in this instance are in the form of centrifugal blowers or fans preferably positioned near the forward leading edge of the wing and at the under side thereof. To cut down air resistance, the blowers 5 are horizontally arranged and disposed within recessed portions 6 formed in the lower portion of the wing with the lower wall of the blower casing 7 even with or in the plane with the under surface of the wing. In this manner, the blowers will be positioned within the confines of the wing and therefore not detract from the usual appearance of the wing structure. It will be understood that each wing may be provided with one or more of these blowers as the occasion may require.

The blower construction 5 may be of the well known type with the casing 7 therefor formed to include a centrally located intake 8 which registers with the vertical bore or passage 9 formed in the body of the wing. The outlet 10 of the blower which is arranged at right angles to the intake 8 is preferably directed rearwardly or transversely of the wing. Located within the casing 7 is the impeller 11 which may be of the ordinary construction and driven in any suitable manner as by gears and shafting 12 connected for rotation with the engine of the plane, or the impellers may be driven directly by motors carried by the wing structure.

It will be seen that by the rotation of the impeller or impellers, air will be drawn downwardly through the vertical passage 9, the inlet opening 8 and forced outwardly through the outlet 10. This rapidly moving air column issuing from the blower will engage with the under side of the wing and due to the inclination of the wing surface 13, will tend to have a lifting effect upon the wing. Also, as this moving air is directed or flows rearwardly against atmospheric air, a forward motion will be imparted to the plane. The combined lifting and propelling effect of the air forced through the blowers will aid considerably in getting the plane under way at its take off and making it possible for the plane to rise substantially vertical from the ground and in a comparatively restricted space. Likewise, with the blowers in operation, the plane may also descend substantially vertically in a similarly restricted space. During flight, the blowers may or may not be in operation, however, their operation may be found useful as when it is desired to hover momentarily over a certain area for observation or other purposes.

It will be observed that due to the employment of centrifugal blowers as lifting mechanisms, the original surface area of the wings will be maintained and due to the arrangement of the blowers, the casings thereof will form parts of the under surfaces of the wings. As the lower walls of the blower casing lie in a plane even with the under surface of the wing, air resistance is cut down to a minimum and the original outline or contour of the wing structure, maintained.

In the modified form of the invention, disclosed in Figs. 4 and 5, the structure illustrated is that of a helicopter type of flying machine. In this form of the invention, the carrying frame 14 has been shown circular or disk shaped, although it will be understood that any other shape or form may be used equally as well. The frame 14 has carried thereby a plurality of blower units 15 similar to those employed in the preferred form of the invention, which blowers in this instance are carried by the under side of the frame and spaced equidistantly from one another and arranged circumferentially around the edge of the frame. The blowers 15, which may be driven in any suitable manner, as by motors 16 coupled directly to the impellers of the blowers have their air inlets registering with openings 17 formed in the frame or disk 14. The outlets 17 from the blowers are directed laterally of the frame and preferably arranged in a direction opposed to one another so that the air streams therefrom will meet centrally of the frame. These meeting air streams or blasts will build up air pressure under the frame and tend to raise the same, and as the combined air streams will form a large air column in a direction downwardly against the atmospheric air, additional lifting force will be imparted to the frame. The frame which is adapted to rise and fall in a substantially vertical plane may be held captive by cables or the like 18 which may be anchored to the ground in any suitable manner.

What is claimed is:

1. In combination with an airplane having a wing structure, said wing structure being formed with a plurality of longitudinally spaced openings formed therein, recesses formed in said wing structure and in communication with said openings, centrifugal blowers arranged in said recesses and having their inlets in registration with said openings, the outlet from said blowers being located within said recesses and arranged toward the rear of the wing structure.

2. In a vehicle of the class described, having a wing structure having recesses formed in the under side thereof, blower casings in said recesses, the lower walls of said casings being substantially flush with the under surface of the wing, centrifugal blowers positioned within said casings, said recesses having a portion of the upper surface thereof downwardly inclined toward the rear edge of the wing structure, openings formed in the upper surface of said wing structure, inlet openings formed in said blower casings, and in registration with said surface openings, outlet openings formed in said blower casings, said last openings being located within said recesses for directing the air from the blowers against the inclined surfaces of said recesses.

In testimony whereof I affix my signature.

OLIVER P. GAYMAN.